(12) United States Patent
Yamagishi (10) Patent No.: US 8,531,934 B2
(45) Date of Patent: Sep. 10, 2013

(54) OPTICAL PICKUP DEVICE AND OPTICAL PICKUP SUPPORTING DEVICE INCLUDING PARTIALLY OVERLAPPING MIRRORS

(75) Inventor: Yasufumi Yamagishi, Kumagaya (JP)

(73) Assignees: SANYO Electric Co., Ltd., Moriguchi-shi (JP); SANYO Optec Design Co., Ltd., Ora-gun (JP)

( * ) Notice: Subject to any disclaimer, the term of this patent is extended or adjusted under 35 U.S.C. 154(b) by 0 days.

(21) Appl. No.: 13/501,417

(22) PCT Filed: Jun. 14, 2011

(86) PCT No.: PCT/JP2011/064000
§ 371 (c)(1),
(2), (4) Date: Apr. 11, 2012

(87) PCT Pub. No.: WO2011/158954

PCT Pub. Date: Dec. 22, 2011

(65) Prior Publication Data

US 2012/0201116 A1    Aug. 9, 2012

(30) Foreign Application Priority Data

Jun. 16, 2010    (JP) .................................. 2010-136776

(51) Int. Cl.
*G11B 7/135*    (2012.01)

(52) U.S. Cl.
USPC ................................. 369/112.29; 369/112.24

(58) Field of Classification Search
USPC ............. 369/112.01, 12.28, 112.291, 112.28, 369/112.29
See application file for complete search history.

(56) References Cited

U.S. PATENT DOCUMENTS

| | | |
|---|---|---|
| 8,064,320 B2 | 11/2011 | Matsuda et al. |
| 8,279,724 B2 * | 10/2012 | Ito .............................. 369/44.14 |
| 2010/0226233 A1 * | 9/2010 | Tanabe et al. ............ 369/112.01 |

FOREIGN PATENT DOCUMENTS

| | | |
|---|---|---|
| JP | 10-312572 | 11/1998 |
| JP | 2005-302164 | 10/2005 |
| JP | 2006004547 A * | 1/2006 |
| JP | 2007334990 A * | 12/2007 |
| JP | 2008-123605 | 5/2008 |
| JP | 2009-26385 | 2/2009 |
| JP | 2010-205377 | 9/2010 |
| JP | 2010257512 A * | 11/2010 |

OTHER PUBLICATIONS

English machine translation of JP 2010-257512 A (Yasuki Mori, Optical Pickup, published Nov. 2010).*
English machine translation of JP 10-312572 (Ezawa et al., Optical-System Driving Device, published Nov. 1998).*
International Search Report mailed Aug. 16, 2011, directed to International Application No. PCT/JP2011/064000; 8 pages.

* cited by examiner

*Primary Examiner* — Hoa T Nguyen
*Assistant Examiner* — Mark Fischer
(74) *Attorney, Agent, or Firm* — Morrison & Foerster LLP (57) ABSTRACT

In order to achieve further cost reduction while the package size of an optical pickup having two objective lenses and the restriction on the disposition of the two objective lenses are maintained, an optical system for laser light emitted from a red/infrared dual-wavelength laser diode is disposed such that a parallel plate beam splitter is disposed to be inclined with respect to the optical axis of focused light of the laser light reflected by an optical disk and the optical axis of the laser light between a rising mirror and the parallel plate beam splitter is inclined from the signal track direction of the optical disk. The laser light to which astigmatism is given by transmission through the parallel plate beam splitter is caused to be directly incident on a light detector without passing through an astigmatism adjustment optical element.

16 Claims, 7 Drawing Sheets

Prior Art

OPTICAL PICKUP DEVICE AND OPTICAL PICKUP SUPPORTING DEVICE INCLUDING PARTIALLY OVERLAPPING MIRRORS

This application is the national stage under 35 USC 371 of the International Application No. PCT/JP2011/064000, filed Jun. 14, 2011, which claims priority from Japanese Patent Application Number JP 2010-136776 filed on Jun. 16, 2010, the contents of which are incorporated herein by reference in its entirety.

FIELD OF THE INVENTION

The present invention relates to an optical pickup device performing an operation of reading a signal recorded in an optical disk and an operation of recording a signal in an optical disk and relates to an optical pickup supporting device.

BACKGROUND OF THE INVENTION

As optical disk devices projecting a laser beam emitted from optical pickup devices onto signal recording layers of optical disks to perform a signal reading operation and a signal recording operation, developments have been made for optical pickup devices capable of performing the signal reading operation for optical disks of the Compact Disc (CD) standard and the Digital Versatile Disc (DVD) standard and for optical disks of the Blu-ray Disc (BD) standard. In such an optical pickup device, a single housing accommodates laser diodes emitting laser beams of plural (three, for example) wavelengths corresponding to the respective standards and optical systems guiding the emitted laser beams to optical disks (refer to Patent Document 1, for example).

Figure 7:
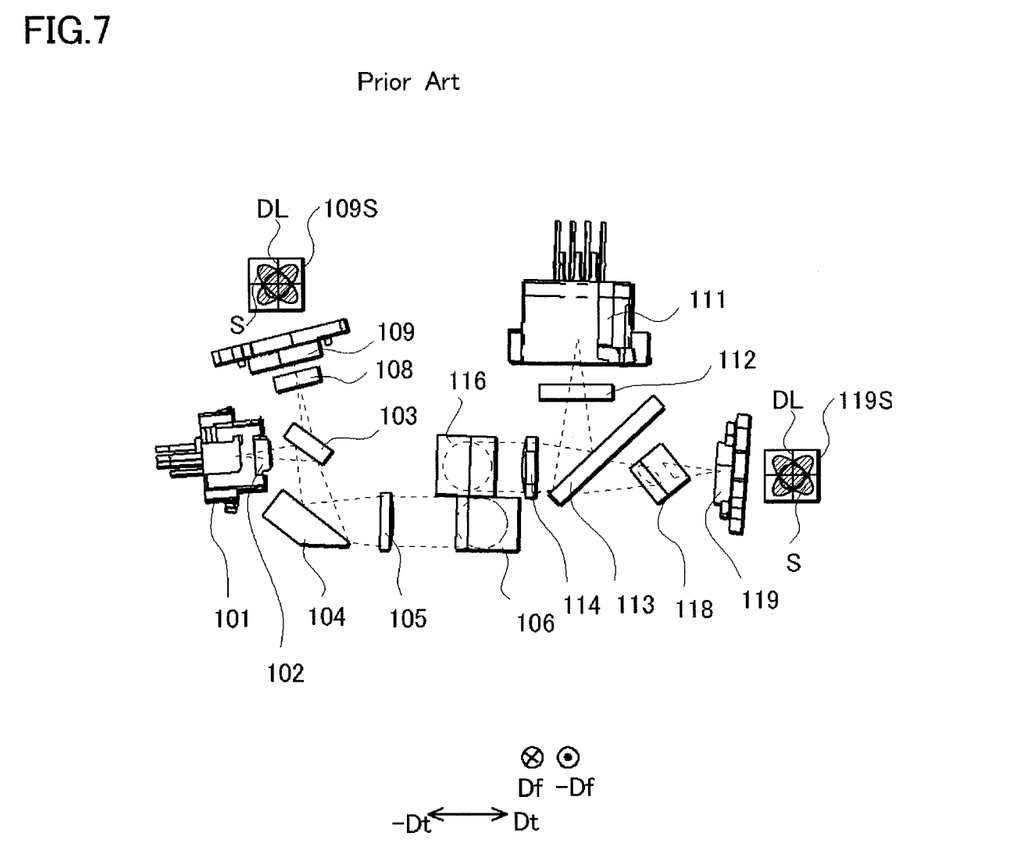
FIG. 7 is a plan view for explaining an optical pickup device having a conventional structure.

With reference to FIG. 7, a description is given of an example of the conventional optical pickup devices. This example is a so-called three-wavelength compatible optical pickup device corresponding to laser beams of three different wavelengths and includes two optical systems which collect laser beams by two objective lenses and guide the same to optical disks. FIG. 7 is a plan view for explaining a main portion of the optical pickup device in the housing.

A laser diode 101 emits a first laser beam which is blue. The first laser beam is transmitted through a first diffraction grating 102 and is incident on a beam splitter 103. The laser beam reflected by the beam splitter 103 is reflected by a reflection mirror 104 and is then transmitted through a first collimator lens 105 to be reflected by a first reflecting mirror 106 in a direction perpendicular to a signal recording surface of an optical disk (in a direction Df). The reflected first laser beam is transmitted through a quarter wave plate (not shown in the drawing) and is converged by a first objective lens for focusing the first laser beam to be projected onto an optical disk of the BD standard.

The first laser beam reflected by the optical disk returns the same path as the forward path. Part of the first laser beam is transmitted through the beam splitter 103 and is given astigmatism at a first astigmatism plate 108 to be projected onto a first photodetector 109 as a circular or elliptical spot.

A two-wavelength laser diode 111 emits a second laser beam as red light and a third laser beam as infrared light. The second and third laser beams are transmitted through a second diffraction grating 112 and is incident on a beam splitter 113. The laser beams transmitted through the beam splitter 113 are passed through a second collimator lens 114 to be reflected in the direction perpendicular to the signal recording surface of an optical disk (in the direction Df). While illustration is omitted, the second and third laser beams are passed through a quarter wave plate and are then converged by a second objective lens for focusing the second and third laser beams. The second laser beam is projected onto an optical disk D of the DVD standard, and the third laser beam is projected onto an optical disk D of the CD standard.

The second and third laser beams reflected by the optical disk D return the same path as the forward path. Part of the second and third laser beams is transmitted through the beam splitter 113 and is then given astigmatism at a second astigmatism plate 118 to be projected onto a second optical detector 119 as a circular or elliptical spot.

The first and second photodetectors 109 and 119 include light receiving units 109S and 119S, respectively and each develop a focus error signal, a tracking error signal, and a reproduced RF signal.

Each of the light receiving units 109S and 119S is composed of a sensor separated into quarters by two division lines DL, for example, and one of the division lines DL is set in a signal track direction (the direction Dt) of the optical disk. The first laser beam is given astigmatism by the first astigmatism plate 108 while being rotated for projection such that the long side of the elliptical spot S is inclined at 45° with respect to the division line DL of the light receiving unit 109S.

Similarly, the second laser beam is given astigmatism by the second astigmatism plate 118 while being rotated for projection such that the long side of the elliptical spot S is inclined at 45° with respect to the division line DL of the light receiving unit 119S.

The focus error signals for use in a focus control operation are generated from the spots S detected by the quadrant sensors 109S and 119S by an astigmatic method.

Patent Document 1: Japanese Patent Laid-open Publication No. 2008-123605

SUMMARY OF THE INVENTION

If the number of parts of an optical pickup device is reduced, it is possible to reduce the cost of the parts and reduce the part assembly hours. The reduction in number of parts therefore has become an important issue to meet the market needs for optical pickup devices of lower prices.

Moreover, an optical pickup device is incorporated in an optical pickup supporting device (a so-called traverse mechanism) for driving the optical pickup device, and the external size (housing size) thereof is restricted by the size of the traverse mechanism. It is therefore desirable that even an optical pickup device having an innovative interior be widely used in existing traverse mechanisms, and it is also necessary to keep the external size not larger than the conventional one.

An object of the present invention is to reduce the number of parts of an optical pickup device while maintaining the external size thereof equal to that of the conventional structure.

The present invention was made in the light of the aforementioned problems, a first aspect of the present invention to solve the problems is an optical pickup device including: a first objective lens configured to receive a first laser beam of a first wavelength from one surface side and converge the first laser beam onto an optical disk provided on the other surface side; a second objective lens configured to receive a second laser beam of a second wavelength from one surface side and converge the second laser beam onto an optical disk provided on the other surface side, the second wavelength being different from that of the first laser beam; a first reflecting mirror which is placed on the one surface side of the first objective lens and is configured to guide the first laser beam to the first objective lens; a second reflecting mirror which is placed on the one surface side of the second objective lens and is configured to guide the second laser beam to the second objective lens; and a parallel plate beam splitter having a reflection surface and a transmission surface and being placed such that the second reflecting mirror is positioned on the reflection surface side, the parallel plate beam splitter being configured to transmit a part of the second laser beam and reflect a part of the second laser beam. In the optical pickup device, the parallel plate beam splitter is placed in a converging optical path of the second laser beam reflected by the optical disk to be inclined with respect to an optical axis of the second laser beam, and a part of the optical axis between the reflection surface of the parallel plate beam splitter and the second reflecting mirror is inclined with respect to a signal track direction of the optical disk.

A second aspect of the present invention to solve the problems is an optical pickup device including: a housing including at least a bottom surface, a sidewall, a partition wall, a curve portion, a first shaft attachment portion, and a second shaft attachment portion, the sidewall extending on the periphery of the bottom surface, the partition wall extending from the bottom surface or the sidewall, the curve portion being a part of the sidewall curved in a planar view, the first shaft attachment portion located at an end of the curve portion, the second shaft attachment portion located at the other end of the curve portion; an optical element which is accommodated by the housing and is fixed together with at least a part of the bottom surface, the sidewall, or the partition wall; a first reflecting mirror configured to reflect a first light beam toward the bottom surface of the housing, the first light beam having a first optical path directed from the first shaft attachment portion toward a top part of the curve portion; and a second reflecting mirror configured to reflect a second light beam toward the bottom surface of the housing, the second light beam having a second optical path diagonally extending from the second shaft attachment portion toward the top part of the curve portion and diagonally intersecting with the first optical path ahead. In the optical pickup device, the first reflecting mirror is placed adjacent to the top part of the curve portion with the other end side down and the one end side up, the second reflecting mirror is placed adjacent to a region of the first reflecting mirror opposite to the curve portion with the one end side down and the other end side up, and upper part of a lateral side of the first reflecting mirror intersecting with the second reflecting mirror is placed to overlap the second reflecting mirror in a planar view.

A third aspect of the present invention to solve the problems is an optical pickup device including: a housing including at least a bottom surface, a sidewall, a partition wall, a curve portion, a first shaft attachment portion, and a second shaft attachment portion, the sidewall extending on the periphery of the bottom surface, the partition wall extending from the bottom surface or the sidewall, the curve portion being a part of the sidewall curved in a planar view, the first shaft attachment portion located at an end of the curve portion, the second shaft attachment portion located at the other end of the curve portion; an optical element which is accommodated by the housing and is fixed together with at least a part of the bottom surface, the sidewall, or the partition wall; a first reflecting mirror configured to reflect a first light beam toward the bottom surface of the housing, the first light beam having a first optical path directed from the first shaft attachment portion toward a top part of the curve portion; and a second reflecting mirror configured to reflect a second light beam toward the bottom surface of the housing, the second light beam having a second optical path diagonally extending from the second shaft attachment portion toward the top part of the curve portion and diagonally intersecting with the first optical path ahead. In the optical pickup device, the first reflecting mirror is placed adjacent to the top part of the curve portion with the other end side down and the one end side up, the second reflecting mirror is placed adjacent to a region of the first reflecting mirror opposite to the curve portion with the one end side down and the other end side up, and the first and second optical paths are different in height from each other.

A fourth aspect of the present invention to solve the problems is an optical pickup supporting device including: a supporting substrate, and a guide shaft fixed to the supporting substrate and supporting one of the above-described optical pickup devices to move the same along the guide shaft.

According to the present invention, the following effects can be obtained.

First, in the optical pickup device including the first and second optical systems which collect laser beams of different wavelengths with the two objective lenses and guide the same to the optical disk, the number of parts and part assembly hours can be reduced, thus reducing the cost of the optical pickup device.

Specifically, in the optical system (the second optical system) guiding a laser beam of one of the laser diodes (the two-wavelength laser diode for DVDs and CDs, for example) to an optical disk, the return light (converged light) of the laser beam reflected by the optical disk is given astigmatism at the parallel plate beam splitter, and the optical axis of the return light between the reflecting mirror and parallel plate beam splitter is inclined at a predetermined angle ($45°\pm15°$ with respect to the signal track direction of the optical disk. This can eliminate the need for an astigmatism correction optical device of the second optical system.

If only the astigmatism correction optical device is removed with the arrangement of the second optical system maintained as conventional, the photodetector cannot properly detect the spot shape of the laser beam and cannot generate a focus error signal. In this embodiment, therefore, the optical axis of the return light of the second optical system is inclined at a predetermined angle ($45°\pm15°$ with respect to the signal track direction of the optical disk, thus allowing generation of a focus error signal even in the configuration where the astigmatism correction optical element is removed.

Secondly, the reflecting mirrors of the two optical systems are configured to partially overlap each other. It is therefore possible to incline the optical axis of the return light of the second optical system with respect to the signal track direction of the optical disk while maintaining the distance between the two objective lenses equal to that in the conventional one.

For example, in the optical pickup device including the objective lens corresponding to optical disks of the BD standard and the objective lens corresponding to optical disks of the DVD and CD standards, each of the two objective lenses is required to collect the laser beam to the innermost track of the corresponding optical disk in which data is recorded, and the center-to-center distance between the two objective lenses cannot be set more than the predetermined distance (4.5 mm, for example).

In the arrangement of a conventional optical system, the two reflecting mirrors laid over the two objective lenses in the direction perpendicular to the signal recording surfaces of the optical disks are arranged in parallel to each other with the side surfaces abutting or close to each other. If the optical axis of the return light of the second optical system is inclined in this embodiment, the distance between the two reflecting mirrors is increased. This will cause misalignment of the two reflecting mirrors from the corresponding first and second objective lenses or require an increase in the distance between the two objective lenses, thus resulting in structural failure.

In this embodiment, the two reflecting mirrors partially overlap each other. This allows the reflecting mirrors to be laid right over (or right under) the two objective lenses the distance of which can be maintained as in the conventional one even if the optical axis of the return light of the second optical system is inclined.

Thirdly, the external (housing) size of the optical pickup device can be maintained equal to that of the conventional device, thus allowing the optical pickup device to be generally incorporated in an existing traverse mechanism.

In order to generate a focus error signal, it is necessary to project the laser beam onto the light receiving unit such that the long side of the spot made elliptical by the given astigmatism is inclined at 45° with respect to the division line of the sensor constituting the light receiving unit of the second photodetector. In this embodiment, this is implemented by inclining the optical axis of the return light of the second optical system at an angle of 45°±15° with respect to the signal track direction of the optical disk. If the optical pickup device with the optical axis inclined at 45° cannot be accommodated in a housing of a conventional size, for example, the angle of inclination of the optical axis may be set to 35°, for example. In this case, the long side of the elliptical spot on the light receiving unit is inclined at 35° with respect to the division line. If the angle of the inclination is within a range of 45°±15°, the focus error signal can be generated by the astigmatic method, and the conventional housing size can be maintained.

DETAILED DESCRIPTION OF THE INVENTION

A description is given of embodiments of the present invention in detail using FIGS. 1A to 6D.

Figure 1A:
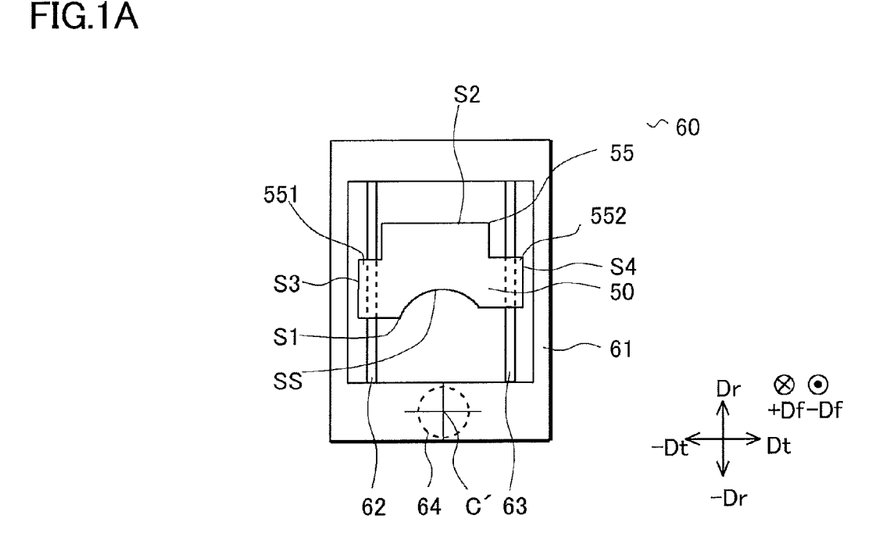
FIGS. 1A and 1B are plan views for explaining an optical pickup device according to an embodiment of the present invention.
Figure 1B:
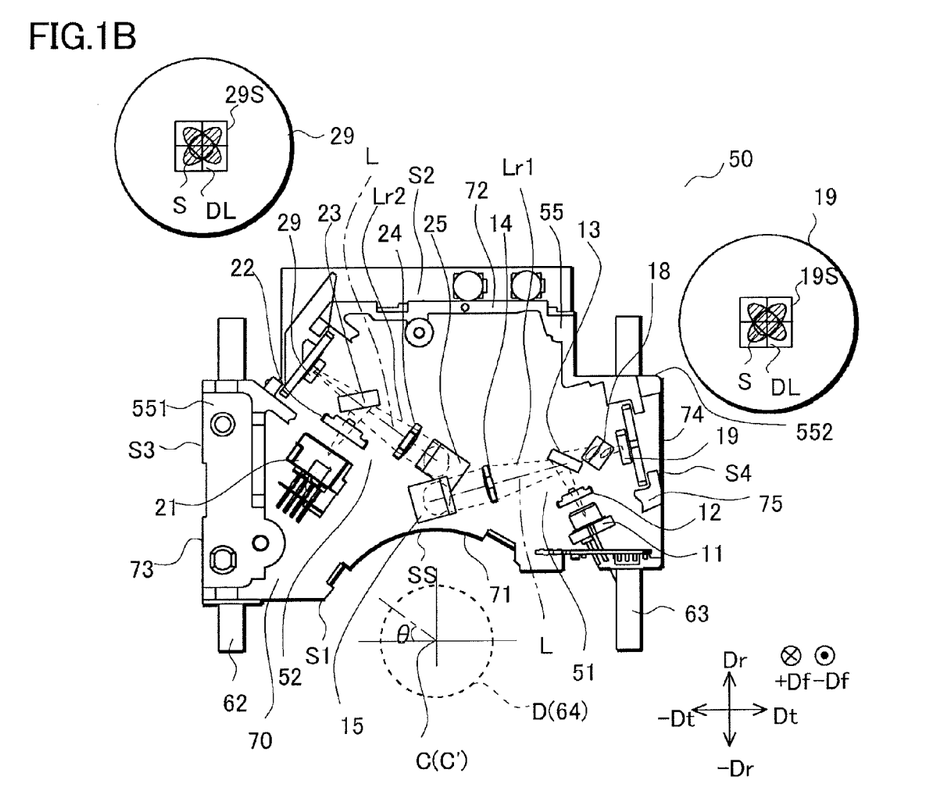
Figure 2A:
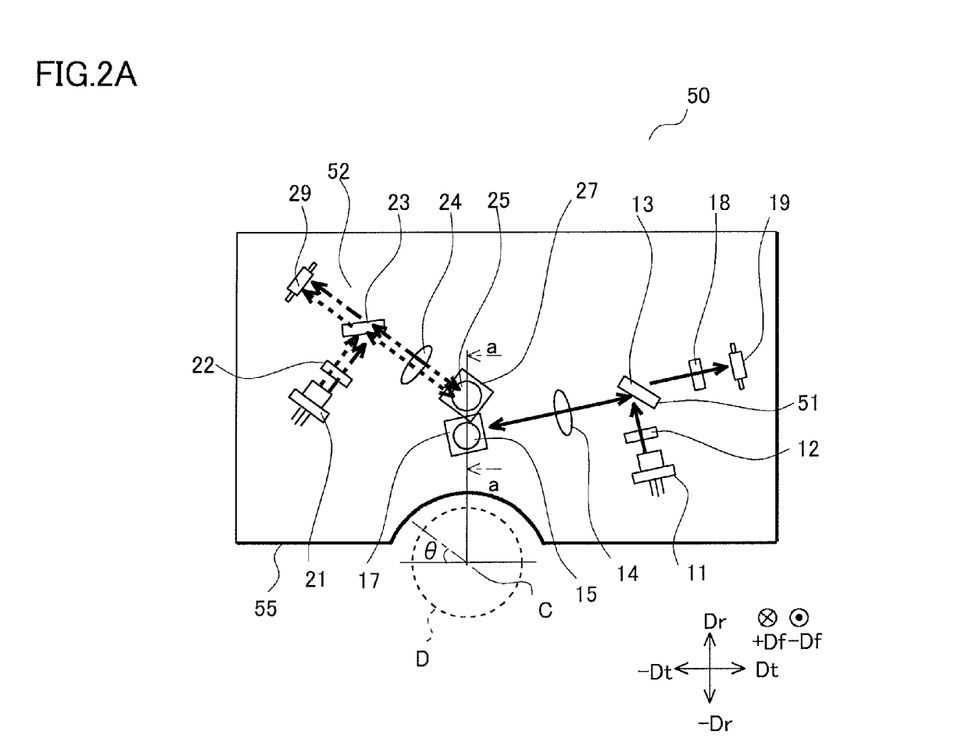
FIGS. 2A and 2B are respectively a plan view and a cross-sectional view for explaining the optical pickup device according to the embodiment of the present invention.
Figure 2B:
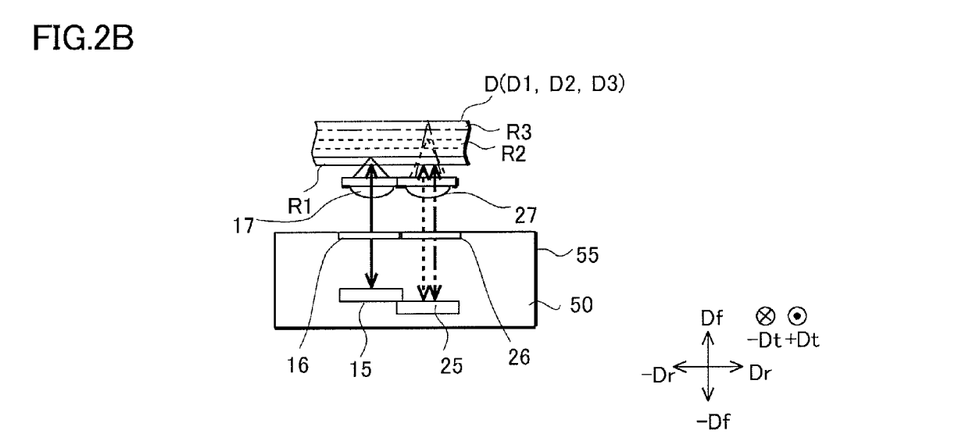

With reference to FIGS. 1A to 2, an optical pickup device 50 of an embodiment and an operation thereof are described.

FIGS. 1A and 1B are plan views for explaining the optical pickup device 50 of the embodiment. FIG. 1A is a schematic view showing an example of an optical pickup supporting device 60 supporting the optical pickup device 50, and FIG. 1B is a view showing a brief overview of the optical pickup device 50. FIGS. 2A and 2B are schematic views for explaining an operation of the optical pickup device 50, FIG. 2A being a plan view, FIG. 2B being a cross-sectional view taken along a line a-a of FIG. 2A.

This embodiment describes the optical pickup device 50 supporting an optical disk of the Blu-ray Disc (hereinafter, BD) standard (a first optical disk D1), an optical disk of the DVD standard (a second optical disk D2), and an optical disk of the CD standard (a third optical disk D3). The first to third optical disks D1 to D3 are collectively referred to as an optical disk D.

In the following drawings, the direction perpendicular to a signal recording surface of the optical disk D (a focusing direction) is called a direction Df, the direction following signal tracks of the optical disk D (a tangential direction) is called a direction Dt, and the radial direction of the optical disk D perpendicular to the direction Dt is called a direction Dr. Each direction is given a sign + or − if needed to be particularly distinguished.

With reference to FIG. 1A, the optical pickup supporting device 60 is a so-called traverse mechanism and includes a chassis 61, guide shafts 62 and 63, a turntable 64, and the optical pickup device 50.

The guide shafts 62 and 63 extend in the direction Dr, and both ends thereof are fixed to the chassis 61. The optical pickup device 50 includes first and second shaft attachment portions 551 and 552 at both sides of a housing 55, and the guide shafts 62 and 63 are inserted through the first and second shaft attachment portions 551 and 552, respectively. The optical pickup device 50 can be therefore supported so as to move along the guide shafts 62 and 63 (in the direction Dr). The chassis 61 is provided with a driving unit (a motor or the like) which has an end fixed to the housing 55 of the optical pickup device 50 and moves the housing 55 in the direction Dr.

At an end of the chassis 61, the turntable 64 is provided. On the turntable 64, an optical disk is placed. The turntable 64 is provided to the back of the chassis 61 (to the back of the page) in the state of FIG. 1A. A center C' of the turntable 64 is coincident with the center of the optical disk D (rotational center).

With reference to FIGS. 1A and 1B, the profile of the housing 55 is roughly described. Originally, the housing 55 may have any top plan view. However, for convenient assembly into a set, the top plan view of the housing 55 is usually substantially rectangular, that is, substantially rectangular with two long sides opposite to each other (first and second sides S1 and S2) and short sides opposite to each other (third and fourth sides S3 and S4). For the purpose of moving the housing 55 by longer distance, the first side S1 on the side where the turntable 64 is placed includes a curve portion SS. The turntable 64 fits into the curve portion SS of the first side S1. Accordingly, the curve portion SS has a substantially same shape as a part of the profile of the turntable 64. The second side S2 is substantially linear. Furthermore, in FIG. 1A, the first and second shaft attachment portions 551 and 552 are provided at the third and fourth sides S3 and S4 so as to allow for insertion of guide shafts 62 and 63 extended in parallel to the third and fourth sides S3 and S4, respectively. The second side S2 located between the two shaft attachment portions 551 and 552 is provided with a protrusion. The both corners of the second side S2 may be cut off.

In this embodiment, the profile of the housing 55 is schematically shown, and each of the second to fourth sides S2 to S4 is represented as a simple straight line in a planar view. However, to be specific, the second to fourth sides S2 to S4 have small protrusions according to the profiles of individual accommodated optical elements in some cases.

The housing 55 has a box shape having at least a bottom surface 70, sidewalls 71, 72, 73, and 74 extended from the circumference of the bottom surface 70, partition walls 75 extending from the bottom surface 70 and sidewalls 71 to 74, the curve portion SS which is a part of the sidewalls 71 to 74 curved in a plan view, the first shaft attachment portion 551 positioned at an end of the curve portion SS, and the second shaft attachment portion 552 positioned at the other end of the curve portion SS. The inside of the housing 55 is separated into plural attachment areas (accommodation portions) and accommodates various optical elements.

The optical elements accommodated in the housing 55 are a laser diode 11, a two-wavelength laser diode 21, a first diffraction grating 12, a second diffraction grating 22, a polarization beam splitter 13, a parallel plate beam splitter 23, a first collimator lens 14, a second collimator lens 24, a first reflecting mirror 15, a second reflecting mirror 25, and the like, which are shown in FIG. 1B, for example. In FIGS. 1A and 1B, the back of the page corresponds to the bottom surface 70 of the housing 55, and the sidewalls 71 to 74 are extended from the circumference of the bottom surface 70 toward the front of the page (to the −Df side) so as to constitute the aforementioned first to fourth sides S1 to S4. Inside the sidewalls 71 to 74, the partition walls 75 are provided on the sidewalls 71 to 74 and bottom surface 70 in the vertical direction to form attachment areas of the optical elements. Herein, the plural partition walls 75 are also provided in the housing 55 besides the partition wall 75 shown in the drawing.

The housing 55 has many portions which are fixed by screws or adhesives. Accordingly, the bottom surface 70, sidewalls 71 to 74, and partition walls 75 are partially made of molded resin as the fixing portions.

Figure 5A:
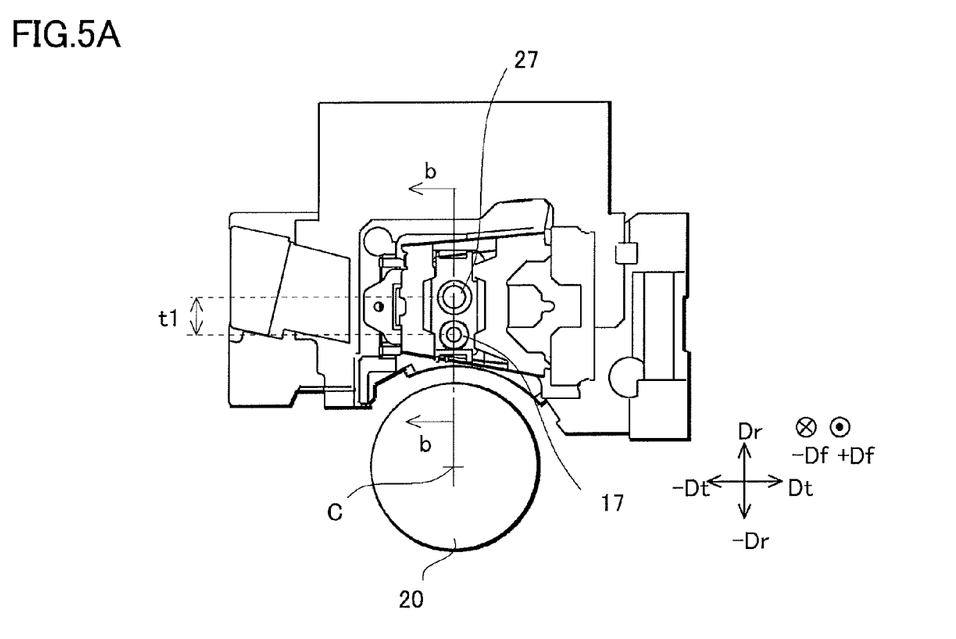
FIGS. 5A and 5B are respectively a plan view and a side view for explaining the optical pickup device according to the embodiment of the present invention.

With reference to FIG. 1B, the optical elements accommodated in the housing 55 include the first and second reflecting mirrors 15 and 25. The first and second reflecting mirrors 15 and 25 are arranged near the curve portion SS side by side along a line which is extended from the center C' of the turntable 64 in a direction that the guide shafts 62 and 63 extend in the radial direction (toward the +Dr side). The first and second reflecting mirrors 15 and 25 are arranged with the centers maintained at a later-described distance t1 (FIG. 5) therebetween.

The first reflecting mirror 15 is placed adjacent to the top part of the curve portion SS of the housing 55 with an end up in the direction Df and the other end down. The second reflecting mirror 25 is placed adjacent to the area of the first reflecting mirror 15 opposite to the curve portion SS with an end down in the Df direction and the other end up.

The first reflecting mirror 15 reflects a first laser beam to a bottom surface 701 of the housing 55, the first laser beam having a first optical path Lr1 extending from the second shaft attachment portion 552 of the housing 55 toward the top part of the curve portion SS (see FIGS. 6A to 6D).

The second reflecting mirror 25 reflects a second laser beam (a third laser beam) toward the bottom surface 70 side of the housing 55, the second laser beam having a second optical path Lr2 extending from the first shaft attachment portion 551 of the housing 55 diagonally to the top part of the curve portion SS and diagonally intersecting with the first optical path Lr1 beyond the top part of the curve portion SS.

In other words, the light beams reflected by the first and second reflecting mirrors 15 and 25 from the front of the page to the back in FIG. 1B (from the −Df side toward the +Df side) are focused on the signal recording surfaces of the optical disks through not-shown first and second objective lenses provided right under the first and second reflecting mirrors 15 and 25 on the +Df side.

In this embodiment, upper part of the lateral side of the first reflecting mirror 15 is overlapped with the second reflecting mirror 25 in a planar view.

With reference to FIG. 1B, the optical pickup device 50 is further described. The optical disk D in the plan views of FIGS. 1B and 2A is schematically shown to indicate the position with respect to the housing of the optical pickup device 50. The size thereof is different from the actual relative size to the optical pickup device 50.

The optical pickup device 50 of this embodiment includes: a first optical system 51 guiding the first laser beam (a solid line) of a first wavelength (405 nm; blue, for example) to the first optical disk D1; and a second optical system 52 guiding the second laser beam (a dashed line) of a second wavelength (650 nm; red, for example) and the third laser beam (a dashed-dotted line) of a third wavelength (780 nm; infrared, for example) to the second and third optical disks D2 and D3, respectively.

First, a description is given of the first optical system 51. The first optical system 51 includes the laser diode 11, first diffraction grating 12, polarization beam splitter 13, first collimator lens 14, first reflecting mirror 15, and first objective lens 17.

With reference to FIGS. 1B and 2A, the laser diode 11 emits the first laser beam. The first diffraction grating 12 separates the incident first laser beam into −1, 0, and +1 order light.

The polarization beam splitter 13 receives the first laser beam transmitted through the first diffraction grating 12 and is configured to reflect the first laser beam polarized in the S direction (S-polarized beam) and transmit the first laser beam polarized in the P direction (P-polarized beam).

The first laser beam is set so as to be S-polarized with respect to a control film (not shown) provided for the polarization beam splitter 13. The linear polarization direction of the first laser beam may be set by rotating the laser diode 11 around the optical axis of the first laser beam or by providing a half wavelength plate between the laser diode 11 and the polarized beam splitter 13 to change the linear polarization direction of the first laser beam emitted from the laser diode 11 with the half wavelength plate.

The first collimator lens 14 receives the first laser beam reflected by the polarized beam splitter 13. The first collimator lens 14 performs an operation of converting the received laser beam into parallel light and compensates the spherical aberration due to the protecting layer of the optical disk D1 of the BD standard.

The first laser beam transmitted through the first collimator lens 14 is reflected by the first reflecting mirror 15 to the +Df side. The first reflecting mirror 15 is located immediately near the first side S1 of the housing 55, particularly, the curve portion SS.

With reference to FIG. 2B, the first reflecting mirror 15 is located on one side of the first objective lens 17 to the −Df side and guides the first laser beam emitted from the laser diode 11 to the first objective lens 17. The first reflecting mirror 15 reflects the first laser beam converted into parallel light by the first collimator lens 14, toward the first objective lens 17 (to the +Df side). The first quarter wave plate 16 converts the first laser beam linearly-polarized into circularly polarized light.

The first objective lens 17 converges the first laser beam incident from the one side (the −Df side) onto the first optical disk D1 placed on the other side (the +Df side). The first laser beam is projected onto a signal recording layer R1 provided for the first optical disk D1 as a spot. The numerical aperture of the first objective lens 17 in this case is set to 0.85.

The first laser beam converged onto the signal recording layer R1 of the first optical disk D1 is reflected by the signal recording layer R1 to be incident on the first objective lens 17 and is then incident on the polarized beam splitter 13 through the first quarter wave plate 16, first reflecting mirror 15, and first collimator lens 14.

The first laser beam is transmitted through the first quarter wave plate 16 twice in the forwarding and returning in the optical path. Accordingly, the first laser beam in the return path has a linear polarization direction rotated by 90° from that in the forward path to be converted into a linearly P-polarized light. The first laser beam travels the first optical path Lr1, and the second and third beams travel the second optical path Lr2. In the following description, the optical path collectively refers to areas which the light fluxes (laser beams of parallel light and converged light (diffusing light)) pass through. The first and second optical paths Lr1 and Lr2 are indicated by thin dashed lines in FIG. 1B and are indicated by a solid arrow and dashed and dotted arrows in FIGS. 2A and 2B, respectively. In FIG. 1B, the center of each of the first and second optical paths Lr1 and Lr2 (light flux) indicated by the dashed and dotted lines is called an optical axis L. Moreover, the first, second, and third laser beams in the return paths which are reflected by the optical disk D are called return light in some cases.

The linearly P-polarized light is transmitted through the control film (not shown) provided for the polarized beam splitter 13 and is incident on the astigmatism correction optical element 18. The astigmatism correction optical element 18 has a cylindrical surface, a plain surface, a concave surface, a convex surface, and the like formed in the incident surface and emission surface, and examples thereof which include a sensor lens, an anamorphic lens, and an astigmatism plate (AS plate).

The astigmatism correction optical element 18 collects the return light of the first laser beam to cause astigmatism. The first photodetector 19 is provided at the position where the return light is projected. The first photodetector 19 has a light receiving unit 19S, which is composed of a sensor divided into at least quarters by two division lines DL orthogonal to each other.

The return light given the astigmatism by the astigmatism correction optical element 18 is projected onto the light receiving unit 19S as an elliptical or circular spot S. The first photodetector 19 detects the spot S and generates a focus error signal, a tracking error signal, and a reproduction RF signal. These signals are outputted to a servo circuit and a reproduction circuit of the disk device. The servo circuit includes a focus servomechanism for focusing in the focusing direction (the direction Df) of the optical disk D and a tracking servomechanism for alignment in the tangential direction (the direction Dt) of the optical disk D.

The focus servomechanism can employ an astigmatic method or differential astigmatic method. The tracking servomechanism can employ a push-pull method, a differential push-pull method, an in-line DPP method, a DPP method, or a three-beam method. Generation of the focus error signal, tracking error signal, and reproduction signal is the same as a known method, and the description thereof is omitted.

Next, a description is given of a second optical system 52. With reference to FIG. 1B and FIG. 2A again, the second optical system 52 includes a two-wavelength laser diode 21, a second diffraction grating 22, a parallel-plate beam splitter 23, a second collimator lens 24, a second reflecting mirror 25, and a second objective lens 27.

The two-wavelength laser diode 21 emits the second laser beam (the dashed line) and the third laser beam (the dotted and dashed line).

The second diffraction grating 22 separates the incident second or third laser beam into 0, +1, and −1 order light.

The parallel-plate beam splitter 23 reflects the S-polarized second or third laser beam and transmits the P-polarized second or third laser beam. The second or third laser beam is set to be S-polarized with respect to the parallel plate beam splitter 23.

The second collimator lens 24 receives the second or third laser beam and converts the incident laser beam parallel light.

The second or third laser beam transmitted through the second collimator lens 24 is reflected by the second reflecting mirror 25 to the +Df side. The second reflecting mirror 25 is placed adjacent to the first reflecting mirror 15 so as to partially overlap the same. The second reflecting mirror 25 is placed so as to sandwich the first reflecting mirror 15 between the second reflecting mirror 25 and the first side S1 (the curve portion SS).

With reference to FIG. 2B, the second reflecting mirror 25 is placed on one side (the −Df side) of the second objective lens 27 and guides the second and third laser beams to the second objective lens 27. The second reflecting mirror 25 reflects the second laser beam to the second objective lens 27 (to the +Df side) and reflects the third laser beam to the second objective lens 27 (to the −Df side).

The second quarter wave plate 26 receives the second or third laser beam reflected by the second reflecting mirror 25 and converts the second or third laser beam from the linearly polarized light into the circularly polarized light.

The second objective lens 27 receives the second and third laser beams from one side (the −Df side) and converges the second and third laser beams onto the second and third optical disks D2 and D3 placed on the other side (the +Df side), respectively.

The second laser beam incident on the second objective lens 27 is projected as a spot onto the signal recording layer R2 of the second optical disk D2 by the converging operation of the second objective lens 27. The numerical aperture of the objective lens 27 is 0.6 in this case. The third laser beam incident on the second objective lens 27 is projected as a spot onto the signal recording layer R2 of the third optical disk D3 by the converging operation of the second objective lens 27. The numerical aperture of the objective lens 27 is 0.45 in this case.

The second or third laser beam converged onto the signal recording layer R2 of the second optical disk D2 or the signal recording layer R3 of the third optical disk D3 by the second objective lens 27 is reflected by the signal recording layer R2 or R3 as return light to be incident on the second objective lens 27 and is then incident on the parallel plate beam splitter 23 through the second quarter wave plate 26, second reflecting mirror 25, and second collimator lens 24. This return light is transmitted through the second quarter wave plate 26 twice (round trip) to be converted into linearly P-polarized light and is therefore transmitted through the parallel plate beam splitter 23.

The second photodetector 29 is provided at the position where the return light having passed through the parallel plate beam splitter 23 is collected and projected. The second photodetector 29 includes a light receiving unit 29S, which is composed of a sensor divided into at least quarters by two division lines DL orthogonal to each other. The return light of the second laser beam (the same goes for the third laser beam) given the astigmatism by the parallel plate beam splitter 23 is projected as an elliptical or circular spot onto the light receiving unit 29S. The second photodetector 29 detects the projected spot and then generates a focus error signal, a tracking error signal, and a reproduction RF signal. The servo circuit and reproduction circuit which receive these signals are the same as those of the first optical system 51, and the description thereof is omitted.

The parallel plate beam splitter 23 of this embodiment causes astigmatism in the return light and rotates the return light such that the long side of the elliptical spot is inclined at a predetermined angle with respect to one of the division lines of the light receiving unit 29S.

Specifically, the second optical path Lr2 of the optical pickup device 50 is inclined at a predetermined angle θ with respect to the direction Dt. In the optical pickup supporting device 60, the second optical path Lr2 is inclined at a predetermined angle θ with respect to the direction (the direction Dt) perpendicular to the extension direction of the guide shafts 62 and 63 (the direction Dr) (see FIG. 1B).

Accordingly, the optical element for correcting astigmatism (hereinafter, referred to as an astigmatism correction optical element), such as an anamorphic lens or an astigmatism plate, can be omitted in the second optical system 52. Hereinafter, a description is given of such a structure.

Figure 3:
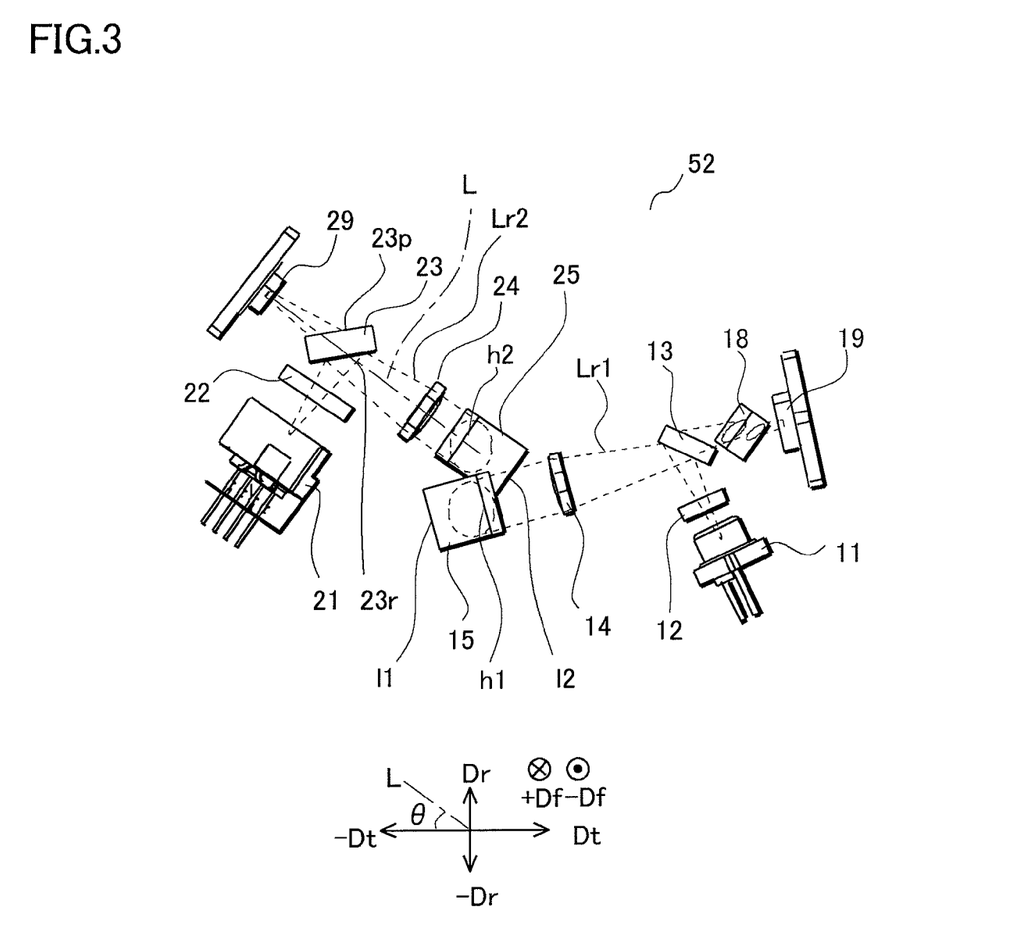
FIG. 3 is a plan view for explaining the optical pickup device according to the embodiment of the present invention.

FIG. 3 is a plan view showing the first and second optical systems 51 and 52. The second optical system 52 is described below taking the second laser beam and second optical disk D2 as examples. The operations of the third laser beam and third optical disk D3 are the same as those of the second laser beam and second optical disk D2. Moreover, a thin dashed line in the first optical system 51 indicates an optical path of the first laser beam; a thin dashed line in the second optical system 52, an optical path of the second laser beam; a dotted and dashed line, the optical axis L of the second laser beam.

The parallel plate beam splitter 23 has a reflection surface 23r and a transmission surface 23p and is placed such that the second reflecting mirror 25 is positioned on the reflection surface 23r side. The parallel plate beam splitter 23 transmits P-polarized light of the second laser beam and reflects S-polarized light thereof.

The second laser beam (return light) reflected by the second optical disk D2 passes through the second collimator lens 24 to be converted from parallel light to converged light and is then projected onto the parallel plate beam splitter 23. The parallel plate beam splitter 23 is placed to be inclined with respect to the optical axis L of the second laser beam on the converging optical path of the return light. This gives astigmatism to the return light of the second laser beam incident on the reflection surface 23r side of the parallel plate beam splitter 23 and emitted from the transmission surface 23p.

Furthermore, in this embodiment, as shown in FIGS. 1B and 2A, part of the optical axis L between the reflection surface 23r of the parallel plate beam splitter 23 and the second reflecting mirror 25 is inclined at a predetermined angle θ with respect to the signal track direction (Dt) of the second optical disk D2. The angle θ of this inclination is 45°±15°. This eliminates the need for the astigmatism correction optical element such as an anamorphic lens or an AS plate.

In the case where the direction of astigmatism caused by the parallel plate beam splitter 23 is not an appropriate direction for the astigmatic method of focus control with respect to the division line DL of the light receiving unit 29S of the second photodetector 29, generally, an astigmatism correction optical element (an anamorphic lens or an AS plate) is required in order to cancel (correct) the astigmatism caused by the parallel plate beam splitter 23. For example, in a conventional structure (see FIG. 7), the second astigmatism plate 118 configured to cause (correct) astigmatism used in focus control is placed between the beam splitter 113 and the second photodetector 119.

In this embodiment, the part of the optical axis L between the reflection surface 23r of the parallel plate beam splitter 23 and the second reflecting mirror 25 is located to be inclined at a predetermined angle θ with respect to the signal track direction (Dt) of the second optical disk D2. This allows the direction of astigmatism caused by the parallel plate beam splitter 23 to be set appropriate for the astigmatic method of focus control with respect to the division line DL of the light receiving unit 29S of the second photodetector 29 without using an astigmatism correction optical element.

This embodiment shows an example in which the optical axis L of the return light in the first optical system 51 is also inclined at about 15° with respect to the direction Dt, for example. However, this is because of restriction due to the shape and size of the housing, and the optical axis of the return light of the first optical system 51 may be parallel to the direction Dt.

Figure 4A:
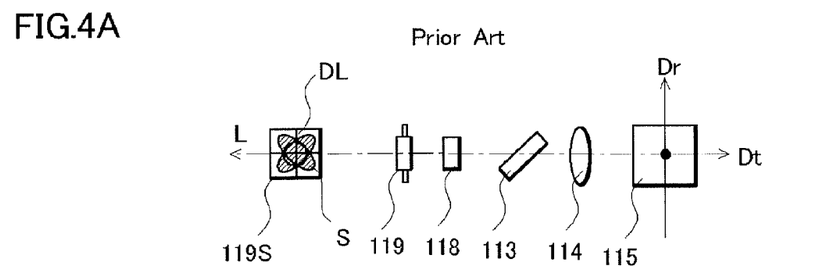
FIGS. 4A to 4C are schematic views for explaining the optical pickup device according to the embodiment of the present invention.
Figure 4B:
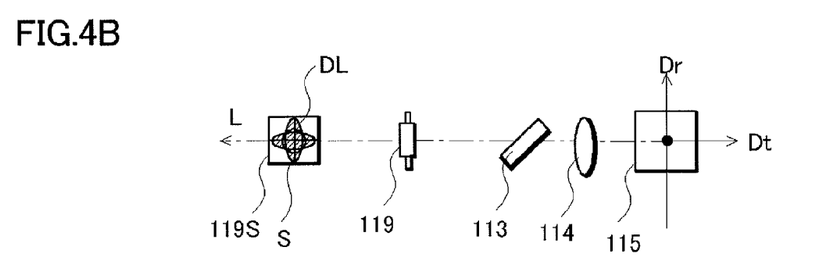
Figure 4C:
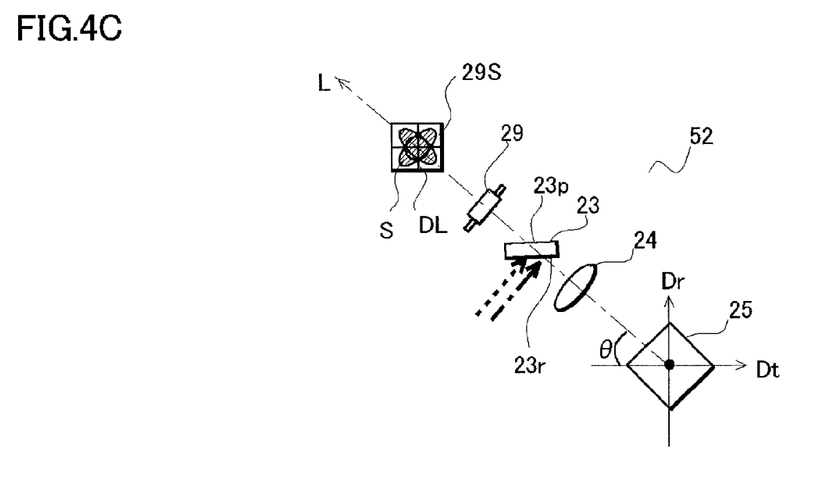

With reference to FIGS. 4A and 4B, a description is further given of the relation between the second photodetector 29 and the second laser beam in the second optical system 52. FIG. 4A is a schematic view showing a configuration of the conventional optical system of FIG. 7. FIG. 4B is a schematic view of an optical system with the astigmatism correction optical element removed from the optical system of FIG. 4A. FIG. 4C is a schematic view of the second optical system 52 of this embodiment.

As an example, each of the light receiving units 29S and 119S of the second photodetectors 29 and 119 includes a sensor separated into quarters by the division lines DL.

With reference to FIG. 4A, the focus error signal by the astigmatic method for performing focus control is generated based on the state where the long side of the elliptical spot S of the return light projected onto the light receiving unit 119S is inclined at 45° with respect to the division line DL of the light receiving unit 119S.

In the conventional second optical system, since the direction of astigmatism caused by the beam splitter 113 is not appropriate for the astigmatic method of the focus control with respect to the division line DL of the light receiving unit 110S of the second photodetector 119, the astigmatism correction optical element 118, such as an AS plate, is provided between the beam splitter 113 and the second photodetector 119. The astigmatism correction optical element 118 is placed such that the optical axis L of the return light of the second laser beam and one of the division lines DL of the light receiving unit 119S constituting the second photodetector 119 are extended along the signal track direction (the direction Dt) of the optical disk D. The return light is thus projected to the light receiving unit 119S. The astigmatism correction optical element 118 gives astigmatism to the return light such that the spot S of the return light projected onto the light receiving unit 119S is substantially circular or elliptical. At the same time, in order to generate the focus error signal by the astigmatism method, the astigmatism correction optical element 118 rotates the return light such that the long side of the elliptical spot S is inclined at 45° with respect to the division line DL of the light receiving unit 119S.

As shown in FIG. 4B, if only the astigmatism correction optical element 118 is removed from the optical system of FIG. 4A, focus control cannot be performed. Specifically, in the configuration of FIG. 4B, the return light is projected onto the second photodetector 119 without passing through the astigmatism correction optical element 118. Since the second photodetector 119 is placed such that the optical axis L of the return light extends along the direction Dt, the angle of the elliptical spot S projected on the light receiving unit 119S is laid on the division line DL of the light receiving unit 119S, thus making it difficult to generate the focus error signal by the astigmatic method.

Accordingly, in this embodiment, as shown in FIG. 4C, the optical axis L of the return light of the second optical system 52, to be specific, part of the optical axis L of the return light between the reflection surface 23r of the parallel plate beam splitter 23 and the second reflecting mirror 25 is inclined at a predetermined angle θ (=45°±15° with respect to the direction Dt. Herein, one of the division lines DL of the light receiving unit 29S of the second photodetector 29 is set in the direction Dt.

The long side of the elliptical spot S projected onto the light receiving unit 29S is therefore inclined at an angle of 45°±15° with respect to the division line DL. Accordingly, the focus error signal can be generated even in the configuration of the second optical system 52 in which no astigmatism correction optical element is provided and the second laser beam transmitted through the parallel plate beam splitter 23 is directly incident on the second photodetector 29 placed on the transmission surface 23p side.

If the angle θ at which the optical axis L of the return light of the second optical system 52 is inclined with respect to the direction Dt is not within the range of 45°±15°, the angle at which the long side of the elliptical spot projected on the light receiving unit 29S with respect to the division line DL of the light receiving unit 29S is not within the range of 45°±15°. In this case, it is not possible to obtain the S curve for generating the focus error signal, thus making the focus control difficult. Accordingly, it is preferable that the angle θ of the inclination of the optical axis L is 45°±15°.

If the angle θ is large even within the aforementioned range, the second optical system 52 requires long space in the direction of the third side S3 (the fourth side S4) of the housing 55, thus making it impossible to maintain the external size of the optical pickup device 50 equal to the conventional one in some cases. In such a case, the focus error signal can be generated as long as the angle θ is within the aforementioned range even if the long side of the elliptical spot is inclined at an angle smaller than 45° with respect to the division line DL of the light receiving unit 29S, and the angle θ of the inclination therefore should be smaller than 45°. In this embodiment, as an example, by inclining the optical axis L of the return light of the second optical system 52 at an angle of 35° with respect to the direction Dt, the size of the external profile (housing) 55 of the optical pickup device 50 can be maintained equal to the size of the conventional one.

The optical pickup device 50 is incorporated in the optical pickup supporting device (a so-called traverse mechanism) to be driven. Accordingly, the size of the external profile (housing) 55 of the optical pickup device 50 is restricted by the size of the traverse mechanism (see FIG. 1A). In other words, it is desirable that even the optical pickup device 50 with the number of parts reduced like this embodiment can be generally used in an existing traverse mechanism. By setting the inclination angle of the optical axis L of the return light to 35°, the external size of the optical pickup device can be maintained equal to the conventional one, and the optical pickup device can be employed in a conventional traverse mechanism and has versatility enhanced.

FIG. 4C shows a quadrant sensor as the light receiving unit 29S of the second photodetector 29, but the same goes for the case where the light receiving unit 29S includes plural sensors. For example, in the case where the light receiving unit 29S is composed of a sensor for a main beam and sensors for sub-beams, the quadrant sensor shown in FIG. 4C serves as the main beam sensor, and the sub-beam sensors are placed on both sides arranged in the direction Dt (to the right and left thereof).

Furthermore, the second optical system 52 may be configured such that the second diffraction grating 22 is removed and only 0-order light (the main beam) is projected onto one quadrant sensor of the light receiving unit 29S. In either case, by inclining the optical axis L of the return light of the second optical system 52 at an angle θ (45°±15° with respect to the direction Dt, the long side of the elliptical spot can be inclined at 45°±15° with respect to the division line DL of the one light receiving unit 29S.

Next, in this embodiment, as shown in FIG. 1B and FIG. 3, the first and second reflecting mirrors 15 and 25 partially overlap each other in the planar view in the direction Df. A description is given of this term with reference to FIGS. 5A and 5B.

Figure 5B:
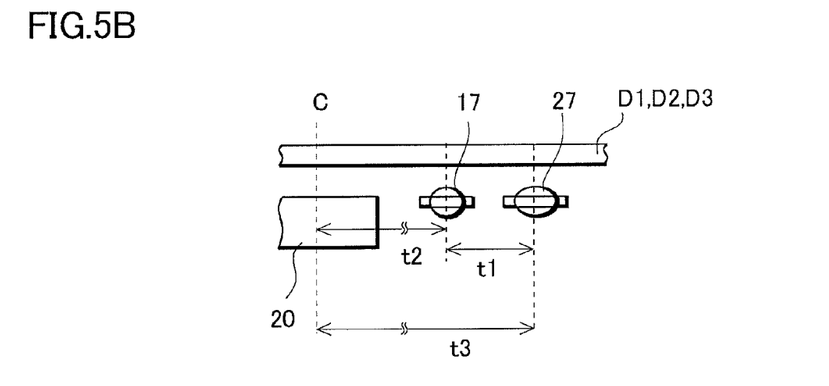

FIG. 5A is a plan view of the optical pickup device 50 shown in FIG. 1B from the +Df side. FIG. 5B is a schematic view showing a relation between the optical disk D and the first and second objective lenses 17 and 27, showing a cross-sectional view taken along a line b-b of FIG. 5A.

The optical pickup device 50 of this embodiment includes the two objective lenses, the first and second objective lenses 17 and 27, which are arranged side by side such that centerline passing through the centers of the first and second objective lenses pass through the rotation center C of the optical disk and extends in the direction Dr (in the radial direction of the optical disk D). The first and second reflecting mirrors 15 and 25 are arranged so as to be laid right over the first and second objective lenses 17 and 27 on the vertical lines in the direction Df, respectively (see FIG. 2B).

As described above, in the optical pickup device including two objective lenses, the arrangement of the optical systems are restricted by a distance t1 between the two objective lenses (the distance t1 can be hardly changed). This is because the two objective lenses need to collect laser beams to the innermost tracks of the corresponding optical disks D in which data is recorded.

In the case of the optical disk D1 of the BD standard, an index is recorded in a track at a distance t2 (21 mm, for example) from the center C of the optical disk D1, and this track is the innermost track of the optical disk D. In the case of the optical disks D2 and D3 of the DVD and CD standards, an index is recorded in a track at a distance t3 (23 mm, for example) from the center C, and this track is innermost track of the optical disk D.

Each of the objective lens 17 corresponding to the optical disk D1 of the BD standard and the objective lens 27 corresponding to the optical disks D2 and D3 of the DVD and CD standards needs to be configured to move to the inner side of the innermost track (toward the center C of the optical disk D) leaving a small margin so as to access the innermost track. Herein, the first objective lens 17 is restricted by the size of a spindle motor 20 rotating the optical disk D so as not to come into contact with the spindle motor 20.

Consequently, the distance t1 between the centers of the first objective lens located close to the center C of the optical disk D and the second objective lens located in the outer side thereof is set to 4.5 mm, for example and cannot be further increased.

In other words, the restriction on the distance t1 between the two objective lenses is directly equal to the restriction on the distance between the centers of the two reflecting mirrors 15 and 25 placed adjacent to each other.

In the arrangement of the conventional optical system, the two reflecting mirrors are placed substantially in parallel to each other with the side surfaces thereof abutting or closely adjacent to each other (see FIG. 7). In this embodiment, if the light axis of the return light of the second optical system 52 is inclined at a predetermined angle θ with respect to the direction Dt such that the first and second reflecting mirrors 15 and 25 do not overlap each other, the distance between the centers of the two reflecting mirrors is increased. However, this will cause misalignment of the first or second reflecting mirrors 15 and 25 from the corresponding first and second objective lenses 17 and 27 or require an increase in the distance between the two objective lenses, resulting in structural failure.

In this embodiment, therefore, the first and second reflecting mirrors 15 and 25 are configured to partially overlap each other. The details thereof are described with reference to FIG. 3. The substantially rectangular first reflecting mirror 15 is placed to be inclined with a side h1 on the light source side set high and the other side 11 opposite thereto set low. Similarly, the substantially rectangular second reflecting mirror 15 is placed to be inclined with a side h2 on the light source side set high and the other side 11 opposite thereto set low. Accordingly, an end of the side h1 (a corner portion) and an end of the side 12 (a corner portion) are overlapped on each other with the side 12 of the second reflecting mirror 25 is provided under the side h1 of the first reflecting mirror 15 (toward the +Df side).

Even if the light axis of the return light of the second optical system 52 is inclined, therefore, the first and second objective lenses 17 and 27 can maintain the distance t1 (4.5 mm, for example) which is equal to the conventional one). This allows implementation of the first and second reflecting mirrors 15 and 17 laid right over the first and second objective lenses 17 and 27 in the direction Df.

In the direction horizontal to the signal recording surface of the optical disk D (in the directions Dt and Dr), the first objective lens 15 is placed on the side near the center of the optical disk D, and the first objective lens 15 is accordingly placed on the side near the center of the optical disk D. In the direction vertical to the signal recording surface of the optical disk D (in the direction Df), the second reflecting mirror 25 is placed close to the signal recording surface of the optical disk D.

Accordingly, the first optical path Lr1 of the first optical system 51 and the second optical path Lr2 do not interfere with each other in an in-plane direction horizontal to the signal recording surface of the optical disk D (in the directions Dt and Dr). In the direction Df, the first and second optical paths Lr1 and Lr2 have a difference in height, and it is therefore possible to prevent interference between the two optical paths Lr1 and Lr2.

FIGS. 6A to 6D are for specific explanation of the first to second reflecting mirrors 15 and 25.

Figure 6A:
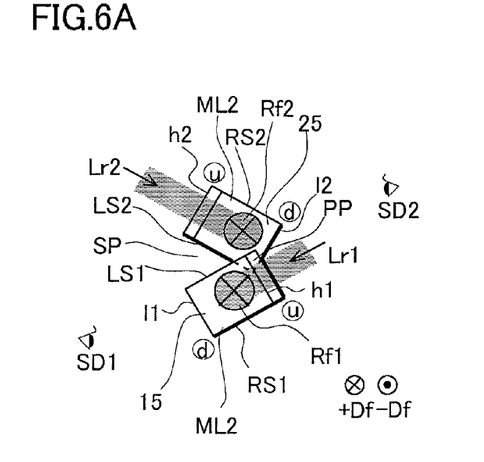
FIGS. 6A, 6B, 6C, and 6D are respectively a plan view, a side view, a side view, and a perspective view for explaining the optical pickup device according to the embodiment of the present invention.
Figure 6B:
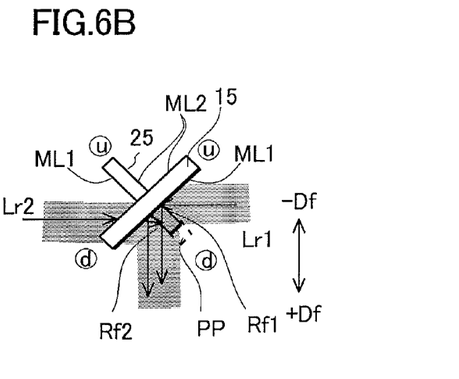
Figure 6C:
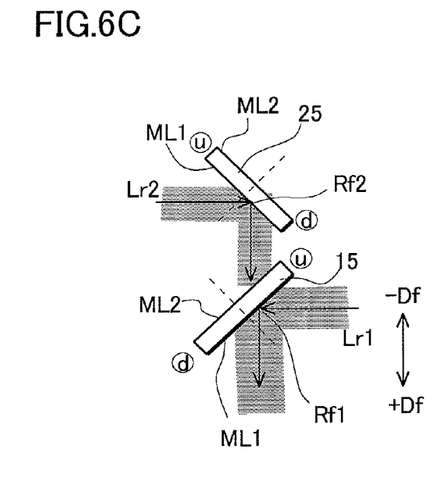
Figure 6D:
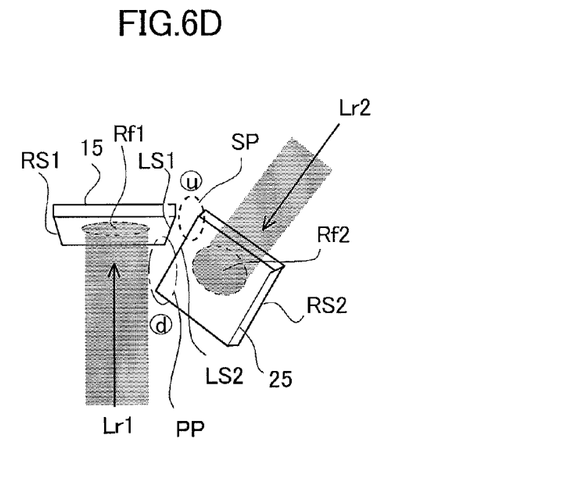

FIG. 6A is a plan view of the first and second reflecting mirrors 15 and 25 extracted from FIG. 1B, and FIG. 6B is a side view of the reflecting mirrors 15 and 25 for explaining the difference in height between the first and second optical paths (optical axes) Lr1 and Lr2. FIG. 6C is a side view for explaining the reflection point of the light flux. FIG. 6D is a perspective view for explaining three-dimensional space between the first and second reflecting mirrors 15 and 25.

Arrows indicate the first and second optical paths Lr1 and Lr2 (the extension directions of the optical axes) of the forward paths (until the light beams are projected onto the optical disks) as an example. The hatchings indicate light fluxes. For explanation of the directions of inclination of the first and second mirrors (upside and downside of the inclination), FIGS. 6A to 6D show the upside (u) and downside (d) of each mirror as labels. The upside u and downside d of each mirror indicate the directions convenient to the following explanation and correspond to the above-described –Df and +Df sides in the direction Df, respectively, but the upside u and downside d are reverse to +Df and –Df sides, respectively. To be specific, in FIGS. 6A to 6D, the upside u of the inclination of each mirror corresponds to the –Df side, and the downside d of the inclination corresponds to the +Df side. In the aforementioned explanation with reference to FIG. 3, the one sides h1 and h2 of the first and second mirrors are located on the upside u, and the other sides 11 and 12 are located on the downside d.

Referring to FIG. 6A, the first and second reflecting mirrors 15 and 25 are glass plates cut into small pieces. For example, the description is given with the first reflecting mirror 15 on the turntable 64 side (see FIG. 1). The first reflecting mirror 15 is composed of a hexahedron having: a rectangular first face ML1 as a reflection surface located on the back of the page (on the +Df side); a second face ML2 facing the first face ML1, and four side faces (cut faces) on the periphery of the first and second faces ML1 and ML2.

In this embodiment, the downside d of the second reflecting mirror 25 is inserted under the upside u of the first reflecting mirror 15 to provide an overlapping portion PP (indicated by a dashed line) in a plan view. The first and second reflecting mirrors 15 and 25 are inclined in the direction from the upside (u) to the downside (d) and are placed such that the first faces ML1 thereof are not in parallel and are inclined to each other at a certain angle. The left corner of the downside d of the second reflecting mirror 25 overlaps the corner of the upside u of the first reflecting mirror 15.

Even in such a structure in which the two mirrors partially overlap each other, the two optical paths Lr1 and Lr2 do not interfere with each other for the following reason.

The optical path Lr1 of light incident on the first reflecting mirror 15 (the first optical path) extends from the upper right to the lower left in the housing 50 in FIG. 1B and is folded at the reflection point Rf1 of the first face ML1 of the first reflecting mirror 15 to the back of the page (to the +Df side). The optical path Lr2 of light incident on the second reflecting mirror 25 (the second optical path) travels from the upper left to the lower right and is folded at the reflection point Rf2 of the first face ML1 of the second reflecting mirror 25 to the back of the page (to the +Df side).

Moreover, the positional relation between the optical paths Lr1 and Lr2 in the direction Df is adjusted so as to prevent the reflected light from the first reflecting mirror 15 from striking the second reflecting mirror 25.

A description is given of this term. FIGS. 6B and 6C are side views of the first and second mirrors 15 and 25 seen from the turntable side (see FIG. 1). FIG. 6C is a view for explaining which regions of the first and second mirrors the reflection points Rf1 and Rf2 of the optical axes (light fluxes) are located, separately showing the first and second mirrors of FIG. 6B. The thin dashed lines indicate centerlines of the first and second mirrors. FIG. 6D is a view for explaining a space SP formed by the inclined first and second mirrors, showing a perspective view in the direction of the first optical path Lr1 incident on the first reflecting mirror 15.

First, the first and second optical paths Lr1 and Lr2 are incident on the first and second reflecting mirrors 15 and 25 with a predetermined angle therebetween such that the extensions of the optical paths Lr1 and Lr2 intersect with each other in a planar view as shown in FIG. 6A. Accordingly, the first and second reflecting mirrors 15 and 25 are placed such that the lateral sides thereof (long sides LS1 and LS2) are inclined to each other at a certain angle and are not in parallel to each other.

FIG. 6D is a view showing FIG. 6A in another direction for explaining the aforementioned positions such that the first optical path Lr1 looks like extending from the downside to the upside in the page.

In a front view of the first reflection mirror 15 as shown in FIG. 6D, the second reflecting mirror 25 is placed with the lateral side (long side LS2) of the second reflecting mirror 25 set diagonal to the lateral side (the long side LS1) of the first reflection mirror 15, and the downside thereof is inserted under the first reflecting mirror 25. The long side LS2 of the second reflecting mirror 25 overlaps the first reflecting mirror 15 more at the lower end and is more separated from the same in the upper side. In other words, the space SP is formed between the upside of the second reflecting mirror 25 and the first reflecting mirror 15.

FIG. 6D shows that the space SP between the lateral sides of the first and second reflecting mirrors (long sides LS12 and LS2) gets wider from the overlapping portion PP upward. The left lateral side (long side LS2) of the second reflecting mirror 25 is arranged at a certain angle with respect to the lateral side (long side LS1) of the first reflecting mirror 15. Accordingly, the long side LS2 overlaps the long side LS1 at the lower end and in the vicinity thereof and is increasingly separated from the long side LS1 toward the upper end. In other words, if the first reflecting mirror 15 is arranged such that the optical path Lr1 is reflected by a portion below the centerline of the first reflecting mirror 15, the first reflecting mirror 15 interferes with the second reflecting mirror 25. On the contrary, if the first reflecting mirror 15 is arranged such that the optical path Lr1 is reflected by a portion above the centerline of the first reflecting mirror 15, the interference between the first and second reflecting mirrors 15 and 25 can be avoided.

The reflection point Rf1 of the first reflecting mirror 15 on the near side of FIG. 6B (on the turntable side) is positioned above the centerline (in the upside (u)) as shown in FIG. 6C. The light flux traveling downward from the first face ML1 is arranged to avoid the second reflecting mirror 25 corresponding to the overlapping portion PP. The light flux to be reflected by the second reflecting mirror 25 is directed from the upper left to the lower right and is reflected by the second reflecting mirror 25 toward the back of the page. At this time, the light flux does not interfere with the first reflecting mirror 15, and basically, the position of the reflection point Rf2 does not make a difference.

The reflection point Rf1 of the first reflecting mirror 15 and the first objective lens 17 are placed so as to be provided on (coincident with) the vertical line in the direction Df. The reflection point Rf2 of the second reflecting mirror 25 and the second objective lens 27 are placed so as to be provided on (coincident with) the vertical line in the direction Df. As described in FIG. 5B, it is necessary to maintain the distant t1 between the first and second objective lenses 17 and 27, and the first and second reflecting mirrors 15 and 25 need to be arranged such that light fluxes are incident on the first and second objective lenses 17 and 27. Accordingly, the distance between the first and second light fluxes Lr1 and Lr2 is restricted by the distance t1.

Specifically, as for the second light flux Lr2, the reflection point Rf2 needs to be located below the first light flux Lr1 and below the centerline of the second reflecting mirror 25. The position of the reflection point Rf2 can be changed under such conditions.

In FIG. 6B, the first reflecting mirror 15 has a left lower part near the bottom surface of the housing (not shown) and is extended diagonally to the upper right at a certain angle. The second reflecting mirror 25 is located behind of the first reflecting mirror 15 (to the back of the page) so as to sandwich the first reflecting mirror 15 between the second reflecting mirror 25 and the turntable (not shown). The second reflecting mirror 25 has a lower right part near the bottom surface of the housing (not shown) and is extended diagonally to the upper left at an angle. The first and second reflecting mirrors 15 and 25 intersect with each other in an X shape in a side view.

In a view of the overlap portion PP in a visual direction SD1 of FIG. 6A, upper left corner part of the first reflecting mirror 15 overlaps the second reflecting mirror 25. In a view of the overlapping portion PP in a visual direction SD2, the lower left corner part of the second reflecting mirror 25 overlaps the first reflecting mirror 15.

The description is given using another expression. As described above, the first faces ML1 as the reflection surfaces of the first and second reflecting mirrors 15 and 25 are rectangular as shown in FIG. 6A (hereinafter, the same goes for the second faces ML2). In the first reflecting mirror 15, one side of the first face ML1 intersecting with the second reflecting mirror 25 is indicated as the long side LS1, and another side of the first face ML1 opposite to the same is indicated as the long side RS1. In the second reflecting mirror 25, one side of the first face ML1 intersecting with the first reflecting mirror 15 is indicated as the long side LS2, and another side of the first face ML2 opposite to the same is indicated as the long side RS2. In other words, when seen in the visual directions SD1 and SD2, the sides seen to the right side are indicated by the long sides RS1 and RS2, and the sides seen to the left side are indicated by the long sides LS1 and LS2. In this case, the upside (u) of the long side LS1 and the downside (d) of the long side LS2 intersect with each other in a planar view. The first light flux Lr1 extending from upper right to lower left to be directed to the first reflecting mirror 15 is reflected by the portion above the centerline of the first reflecting mirror 15 because of the aforementioned space SP (FIG. 6D). Since the reflected light travels downward, the reflection point Rf1 is located so as to avoid the overlap portion PP of the second reflecting mirror 25. In other words, in FIG. 6A, the reflection point Rf1 is located above the centerline of the first reflecting mirror 15 in such a range that the reflection point Rf1 is not located in the overlap portion PP such that the outer circumference of the first optical axis Lr1 does not intersect with the lateral side (long side LS2) of the second reflecting mirror 25.

As described in FIGS. 2A and 2B, the centers of the circles indicating the reflection points Rf1 and Rf1 of the light fluxes in FIG. 6A are located on a solid line directed from the center C of the optical disk (the turntable) in the radial direction (the direction Dr).

Hereinabove, this embodiment describes for the first objective lens 17 for the BD standard. However, the same goes for an objective lens for the HD-DVD standard.

Moreover, the description of this embodiment takes as an example the optical pickup device including two objective lenses corresponding to BD/DVD/CD standards. However, this embodiment can be implemented for another optical pickup device using two objective lenses and corresponding to other standards.

The invention claimed is:

1. An optical pickup device, comprising:
a first objective lens configured to receive a first laser beam of a first wavelength from one surface side and converge the first laser beam onto an optical disk provided on another surface side;
a second objective lens configured to receive a second laser beam of a second wavelength from one surface side and converge the second laser beam onto an optical disk provided on another surface side, the second wavelength being different from the first wavelength of the first laser beam;

a first reflecting mirror which is placed on the one surface side of the first objective lens and is configured to guide the first laser beam to the first objective lens; and a second reflecting mirror which is placed adjacent to the first objective lens on the one surface side of the second objective lens and is configured to guide the second laser beam to the second objective lens, wherein the first and second objective lenses are placed such that a centerline passing through a center of the first objective lens and a center of the second objective lens extends in a radial direction perpendicular to a signal track direction of the optical disks, the first and second reflecting mirrors are placed with adjacent lateral sides thereof intersecting with each other in a plan view of the optical pickup device so as to cause end portions thereof to overlap each other in the plan view, a reflection point of one surface of the first reflecting mirror at which the first laser beam is reflected is displaced from a center of the one surface to avoid interference between the reflected first laser beam and the end portion of the second reflecting mirror.

2. The optical pickup device according to claim 1, wherein one surface of the second reflecting mirror by which the second laser beam is reflected has a rectangular profile, a surface opposite to the one surface has a rectangular profile, and one of corners of each of the rectangular profiles overlaps a part of the first reflecting mirror around one of the lateral sides.

3. The optical pickup device according to claim 2, wherein a corner portion of the second reflecting mirror is placed between the first reflecting mirror and the first objective lens in a direction perpendicular to a signal surface of the optical disks.

4. The optical pickup device according to claim 1, wherein each of the first and second reflecting mirrors is hexahedral.

5. The optical pickup device according to claim 1, wherein an optical axis of the second laser beam incident on the second reflecting mirror is inclined with respect to the signal track direction of the optical disks.

6. The optical pickup device according to claim 1, further comprising:

a parallel plate beam splitter having a reflection surface and a transmission surface and being placed such that the second reflecting mirror is positioned on the reflection surface side, the parallel plate beam splitter being configured to transmit a part of the second laser beam and reflect a part of the second laser beam; and a photodetector placed on the transmission surface side of the parallel plate beam splitter, wherein the second laser beam transmitted through the parallel plate beam splitter is directly incident on the photodetector.

7. The optical pickup device according to claim 6, wherein the photodetector includes a light receiving region divided into at least quarters by two division lines orthogonal to each other, and one of the division lines is set in the signal track direction of the optical disks.

8. The optical pickup device according to claim 6, wherein a converged light incident on the reflection surface of the parallel plate beam splitter and then emitted from the transmission surface is given astigmatism by the parallel plate beam splitter.

9. The optical pickup device according to claim 1, wherein, in a sectional view of the optical pickup device, the first reflecting mirror and the second reflecting mirror cross each other to form an X shape.

10. The optical pickup device according to claim 1, wherein a center line of the first laser beam at the reflection point of the one surface of the first reflecting mirror is displaced from the center of the one surface of the first reflecting mirror.

11. An optical pickup device, comprising:

a housing including a bottom surface, a sidewall, a partition wall, a curve portion, a first shaft attachment portion, and a second shaft attachment portion, the sidewall extending on the periphery of the bottom surface, the partition wall extending from the bottom surface or the sidewall, the curve portion being a part of the sidewall curved in a plan view of the optical pickup device, the first shaft attachment portion being located at an end of the curve portion, the second shaft attachment portion located at the other end of the curve portion;

an optical element which is accommodated by the housing and is fixed to at least a part of the bottom surface, the sidewall, or the partition wall;

a first reflecting mirror configured to reflect a first light beam toward the bottom surface of the housing, the first light beam having a first optical path; and a second reflecting mirror configured to reflect a second light beam toward the bottom surface of the housing, the second light beam having a second optical path diagonally extending in the plan view from the second shaft attachment portion toward the top part of the curve portion and in a direction different from the first optical path, wherein the first reflecting mirror is placed adjacent to the top part of the curve portion, the second reflecting mirror is placed adjacent to a region of the first reflecting mirror opposite to the curve portion, in the plan view, of a lateral side of the first reflecting mirror intersecting with a lateral side surface of the second reflecting mirror is so that the first reflecting mirror and the second reflecting mirror partially overlap each other, and a reflection point of one surface of the first reflecting mirror at which the first light beam is reflected is displaced from a center of the one surface to avoid interference between the reflected first light beam and an end of the second reflecting mirror.

12. An optical pickup device according to claim 11, wherein each of the first and second reflecting mirrors is hexahedral.

13. The optical pickup device according to claim 11, wherein the first and second optical paths are different in height.

14. An optical pickup supporting device, comprising:

a supporting substrate, and a guide shaft fixed to the supporting substrate, wherein the optical pickup supporting device supports the optical pickup device according to claim 11 such that the optical pickup device is movable along the guide shaft.

15. The optical pickup supporting device according to claim 14, wherein the second optical path of the optical pickup device is inclined at a predetermined angle with respect to a direction perpendicular to a direction that the guide shaft is extended.

16. The optical pickup device according to claim 11, wherein a center line of the first laser beam at the reflection point of the one surface of the first reflecting mirror is displaced from the center of the one surface of the first reflecting mirror.

* * * * *